(12) United States Patent
Jung et al.

(10) Patent No.: US 8,837,730 B2
(45) Date of Patent: Sep. 16, 2014

(54) APPARATUS AND METHOD FOR REDUCING CHANNEL REPRODUCTION DELAY IN MOBILE TERMINAL

(75) Inventors: Ji-Wuck Jung, Suwon-si (KR); Young-Jip Kim, Suwon-si (KR); Joon-Ho Park, Hwaseong-si (KR); Jin-Woo Jeon, Suwon-si (KR); Jae-Sung Yi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 12/924,116

(22) Filed: Sep. 21, 2010

(65) Prior Publication Data

US 2011/0069838 A1  Mar. 24, 2011

(30) Foreign Application Priority Data

Sep. 21, 2009  (KR) .......................... 10-2009-0088934

(51) Int. Cl.
*H04K 1/00* (2006.01)
*H04N 7/167* (2011.01)
*H04L 9/08* (2006.01)
*H04W 12/02* (2009.01)
*H04W 12/04* (2009.01)
*H04W 12/06* (2009.01)

(52) U.S. Cl.
CPC .............. *H04W 12/02* (2013.01); *H04W 12/04* (2013.01); *H04W 12/06* (2013.01); *H04L 2209/601* (2013.01); *H04N 7/1675* (2013.01)
USPC .......................................... 380/270; 210/278

(58) Field of Classification Search
None
See application file for complete search history.

(56) References Cited

U.S. PATENT DOCUMENTS

| 6,510,515 | B1 * | 1/2003 | Raith ............................ 713/163 |
| 7,779,154 | B2 * | 8/2010 | Lipsanen et al. ............. 709/239 |
| 2002/0104001 | A1 * | 8/2002 | Lotspiech et al. ............ 713/163 |
| 2003/0078061 | A1 * | 4/2003 | Kim ............................. 455/466 |
| 2006/0212399 | A1 * | 9/2006 | Akiyama ........................ 705/50 |

* cited by examiner

*Primary Examiner* — Fatoumata Traore

(57) ABSTRACT

An apparatus and a method reduce delay when reproducing digital broadcasting in a mobile terminal. More particularly, the apparatus and method reduce a reproduction delay, from having to stand by until an encrypted stream that matches with a traffic key is received, by receiving the traffic key in advance prior to the encrypted stream when a mobile terminal receives encrypted broadcasting. The apparatus includes a controller. The controller receives and stores a traffic key corresponding to an encrypted channel even when not entering the encrypted channel, and deciphers and reproduces the relevant channel using the stored traffic key when entering the encrypted channel.

17 Claims, 7 Drawing Sheets

APPARATUS AND METHOD FOR REDUCING CHANNEL REPRODUCTION DELAY IN MOBILE TERMINAL

CROSS-REFERENCE TO RELATED APPLICATION(S) AND CLAIM OF PRIORITY

This application claims the benefit under 35 U.S.C. §119(a) of a Korean patent application filed in the Korean Intellectual Property Office on Sep. 21, 2009, and assigned Serial No. 10-2009-0088934, the entire disclosure of which is hereby incorporated by reference.

TECHNICAL FIELD OF THE INVENTION

The present invention relates to an apparatus and a method for reproducing digital broadcasting in a mobile terminal. More particularly, the present invention relates to an apparatus and a method for reducing a reproduction delay, from having to stand by until an encrypted stream that matches with a traffic key is received, by receiving the traffic key in advance prior to the encrypted stream when a mobile terminal receives encrypted broadcasting.

BACKGROUND OF THE INVENTION

Recently, as a mobile terminal develops rapidly, a mobile terminal that enables wireless voice communication and information exchange has become a necessity. In an early stage of distribution, a mobile terminal was simply recognized as a product that can be carried and enables wireless communication. As technology develops and a wireless Internet is introduced, the mobile terminal is used not only for the purpose of simple telephone communication or schedule management but also for games, remote control applications using short distance communication, and image capturing by a mounted digital camera, such that its utilization range is expanded.

Furthermore, as digital broadcasting technology develops, a mobile terminal that supports reception of digital broadcasting has been developed to enable viewing of digital multimedia broadcasting while on the move, drawing much attention from users.

Digital multimedia broadcasting may be divided into an encrypted service and an unencrypted service. The unencrypted broadcast service denotes a service that allows a general broadcast viewer to freely view a relevant service according to fixed type ground wave broadcasting. The encrypted broadcast service denotes a service that only allows a user who has obtained a broadcast service use authority to access a relevant broadcasting service according to a subscription-based channel.

The encrypted broadcast service uses the following general encryption scheme. The encryption scheme may include a 3-layer, 2-layer and 1-layer. The 3-layer is an uppermost layer that encrypts a broadcast service and deciphers the encrypted broadcast service. The 2-layer is a middle layer that encrypts a traffic key and deciphers the encrypted traffic key. The 1-layer is a lowermost layer that generates and extracts a service key.

A system that supports the encrypted broadcast service encrypts and transmits a broadcast channel in the 3-layer using an encryption protocol such as Internet Protocol Security (IPSec), Internet Streaming Media Alliance encryption and authentication (ISMACrypt), and so forth.

To decipher encrypted contents of the 3-layer, a traffic key transmitted from the 2-layer is required. Because the traffic key, which is required for deciphering an encryption protocol of the 3-layer, is vulnerable to hacking, it is changed frequently and transmitted with a period of approximately several to tens of seconds. In addition, because the traffic key is encrypted using a service key, which is the 1-layer key, when a mobile terminal that does not have a service key receives a traffic key of the 2-layer, the mobile terminal cannot extract a key required for deciphering an encryption protocol of the 3-layer.

Because the traffic key is transmitted in advance before an encrypted stream, the mobile terminal has a problem of having to stand by for a predetermined time when receiving the encrypted stream that matches with the traffic key. For example, when the mobile terminal receives a 'No. 3' traffic key while receiving a 'No. 2' encrypted stream, the mobile terminal has to stand by until receiving a 'No. 3'stream that can be decrypted using a currently received traffic key, such that a reproduction time of an encrypted channel is delayed.

SUMMARY OF THE INVENTION

To address the above-discussed deficiencies of the prior art, one aspect of the present invention is to address at least the above-mentioned problems and/or disadvantages and to provide at least the advantages described below. Accordingly, an aspect of the present invention is to provide an apparatus and a method for providing an improved digital broadcast service in a mobile terminal.

Another aspect of the present invention is to provide an apparatus and a method for reducing a reproduction delay time occurring during reproduction of encrypted broadcasting in a mobile terminal.

Another aspect of the present invention is to provide an apparatus and a method for reducing a reproduction delay by storing, in advance, a traffic key before reproducing encrypted broadcasting in a mobile terminal.

Yet another aspect of the present invention is to provide an apparatus and a method for reducing power consumption by receiving a changed traffic key at a period when the traffic key changes in a mobile terminal.

In accordance with an aspect of the present invention, an apparatus for reducing a channel reproduction delay in a mobile terminal is provided. The apparatus includes a controller for receiving and storing a traffic key corresponding to an encrypted channel even when not entering the encrypted channel, and deciphering and reproducing the relevant channel using the stored traffic key when entering the encrypted channel.

In accordance with another aspect of the present invention, a method for reducing a channel reproduction delay in a mobile terminal is provided. The method includes receiving and storing a traffic key corresponding to an encrypted channel even when not entering the encrypted channel. The relevant channel is deciphered and reproduced using the stored traffic key when entering the encrypted channel.

In accordance with yet another aspect of the present invention, a mobile device is provided. The mobile device includes a communication unit for receiving radio frequency (RF) signals and recovering data from the received RF signals. A broadcast information storage stores a plurality of traffic keys. a controller for receives a traffic key corresponding to an encrypted channel, stores the traffic key corresponding to the encrypted channel in the broadcast information storage prior to entering the entering the encrypted channel, and deciphers and reproduces the encrypted channel using the stored traffic key when entering the encrypted channel.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure.

Embodiments of the present invention provide an apparatus and a method for providing an improved digital broadcast service by storing, in advance, a traffic key before reproducing encrypted broadcasting, thereby reducing a reproduction delay in a mobile terminal.

Figure 1A:
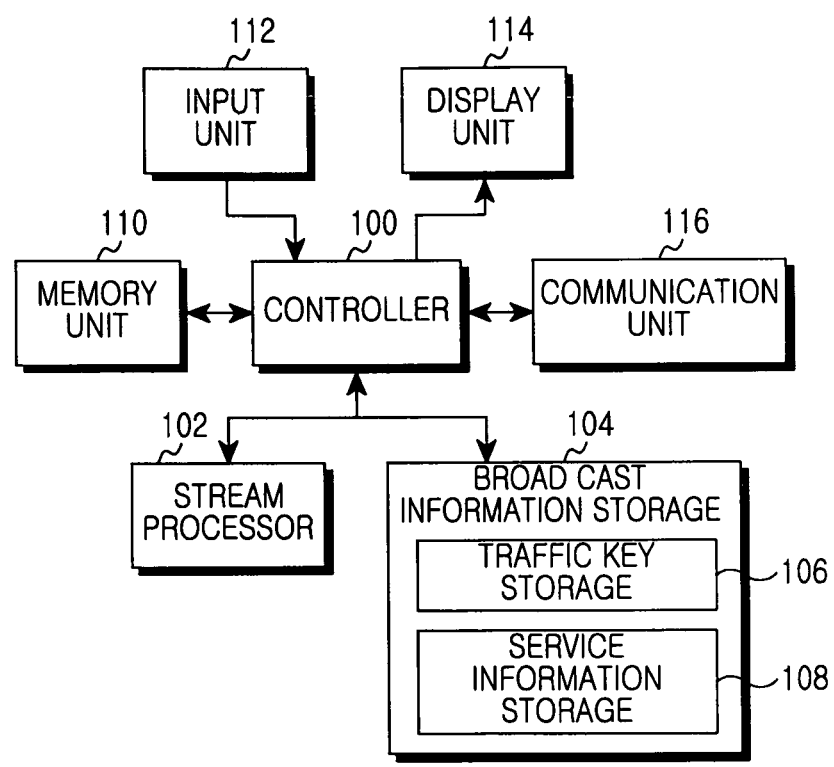
FIG. 1A illustrates a mobile terminal for reproducing an encrypted channel according to an embodiment of the present invention.
Figure 1B:
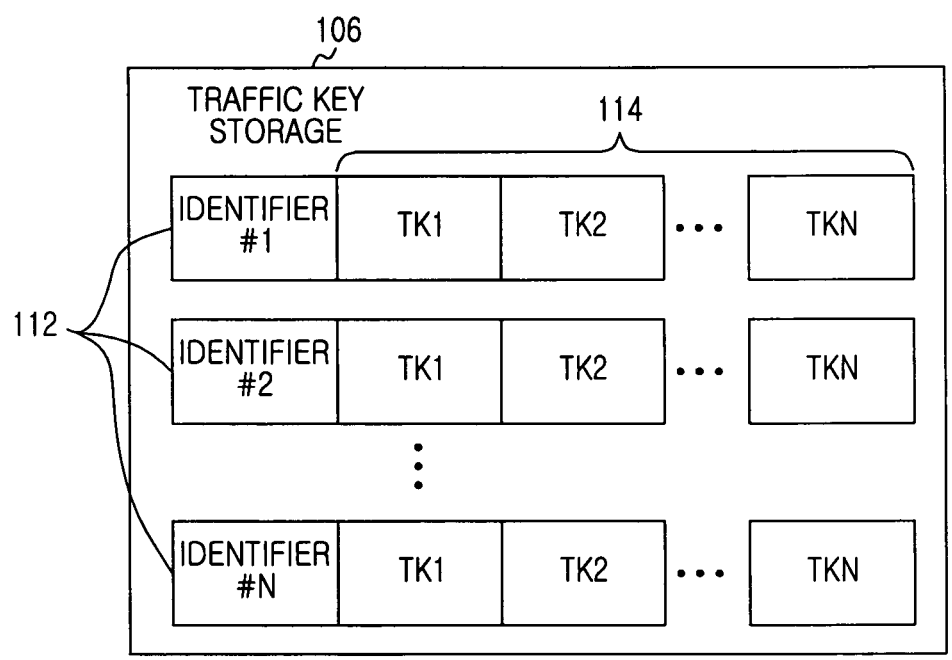
FIG. 1B illustrates a process for storing a traffic key in a mobile terminal according to an embodiment of the present invention.

FIGS. 1A and 1B illustrate a mobile terminal according to an embodiment of the present invention.

FIG. 1A illustrates a mobile terminal for reproducing an encrypted channel according to an embodiment of the present invention.

As shown in FIG. 1A, the mobile terminal may include a controller 100, a stream processor 102, a broadcast information storage 104, a memory unit 110, an input unit 112, a display unit 114, and a communication unit 116. The broadcast information storage 104 may include a traffic key storage 106 and a service information storage 108. The portable terminal may include additional units. Similarly, the functionality of two or more of the above units may be integrated into a single component.

The controller 100 of the mobile terminal performs processes and controls for an overall operation of the mobile terminal, such as voice communication and data communication. According to an embodiment of the present invention, when receiving digital broadcast at the mobile terminal, the controller 100 receives and stores a traffic key corresponding to an encrypted channel. At this point, the controller 100 receives a traffic key corresponding to an encrypted channel before the mobile terminal receives encrypted broadcasting, for example, while receiving unencrypted broadcasting.

In addition, the controller 100 performs monitoring only at a point (a traffic key change period) when a traffic key changes to receive and store a relevant traffic key, thereby reducing power consumption.

The stream processor 102 deciphers a broadcast signal received via the communication unit 116 using a service key that has been stored in advance.

In more detail, the stream processor 102 divides a broadcast signal received via the communication unit 116 into a broadcast service stream and a traffic key stream, and deciphers the traffic key stream to receive the traffic key.

The broadcast information storage 104 stores information used for receiving a traffic key corresponding to encrypted broadcasting. The traffic key storage 106 of the broadcast information storage 104 stores a traffic key obtained by the controller 100. The service information storage 108 of the broadcast information storage 104 stores a list regarding encrypted broadcasting. The list regarding the encrypted broadcasting may be generated using information received when the list is purchased to obtain a viewing right.

The memory unit 110 includes Read Only Memory (ROM), Random Access Memory (RAM), a flash ROM and such. The ROM stores microcodes of programs for processes and controls of the controller 100 and various reference data.

The RAM serves as a working memory of the controller 100 and stores temporary data during execution of various programs. In addition, the flash ROM stores various updatable data for storage such as a phonebook, sent messages, and received messages.

The input unit 112 includes a plurality of function keys such as numerical key buttons of 0 to 9, a menu button, a cancel button, an OK button, a TALK button, an END button, an Internet access button, navigation key buttons, letter input keys, and such. The input unit 112 provides key input data (e.g., a channel change request) corresponding to a key pressed by a user to the controller 100.

The display unit 114 displays status information generated during an operation of the mobile terminal, a limited number of letters, a large amount of moving images and still images, a favored channel list, and such. The display unit 114 may be a color Liquid Crystal Display (LCD), an Active Mode Organic Light Emitting Diode (AMOLED), and such.

The communication unit 116 transmits/receives a Radio Frequency (RF) signal of data input/output via an antenna (not illustrated). For example, during transmission, the communication unit 116 channel-codes and spreads data to be transmitted, and then performs an RF process on the signal to transmit the signal. During reception, the communication unit 116 converts a received RF signal into a baseband signal, and de-spreads and channel-decodes the baseband signal to recover data.

The broadcast information storage 104 may be included in the memory unit 110 of the mobile terminal. The separate configuration and illustration of the broadcast information storage 104 are for illustrative purposes only, and do not limit the scope of the present invention. Those skilled in the art would recognize that various modifications may be made within the scope of the present invention. For example, all of the broadcast information storage 104 may be defined as the memory unit 110.

FIG. 1B illustrates a process for storing a traffic key in a mobile terminal according to an embodiment of the present invention.

As shown in FIG. 1B, the mobile terminal receives a traffic key corresponding to an encrypted channel before receiving encrypted broadcasting to store the traffic key in the traffic key storage 106.

At this point, the mobile terminal sets an identifier 112 corresponding to the encrypted broadcasting to store a traffic key for each broadcast. That is, when allowance for N encrypted broadcastings is given to the mobile terminal, the mobile terminal sets N identifiers (identifier #1 to identifier #N) to store traffic keys corresponding to respective identifiers. At this point, the mobile terminal may use IP information as the identifier in a Digital Video Broadcasting (DVB)-Handheld (DVB-H) system, and may use a Program ID (PID) as the identifier in a Moving Picture Experts Group (MPEG) transmission system. An identifier may be allocated depending on each system characteristic in other broadcast systems.

The traffic key 114 includes N keys (TK 1 to TK N), and the discriminated traffic key denotes a traffic key changed every predetermined period.

In the preceding paragraphs, an apparatus for reducing a reproduction delay by storing a traffic key in advance before reproducing encrypted broadcasting according to an embodiment of the present invention has been described. In the following paragraphs, a method for providing an improved digital broadcast service by storing a traffic key in advance before reproducing encrypted broadcasting, thereby reducing a reproduction delay using the above apparatus, according to an embodiment of the present invention, will be described.

Figure 2:
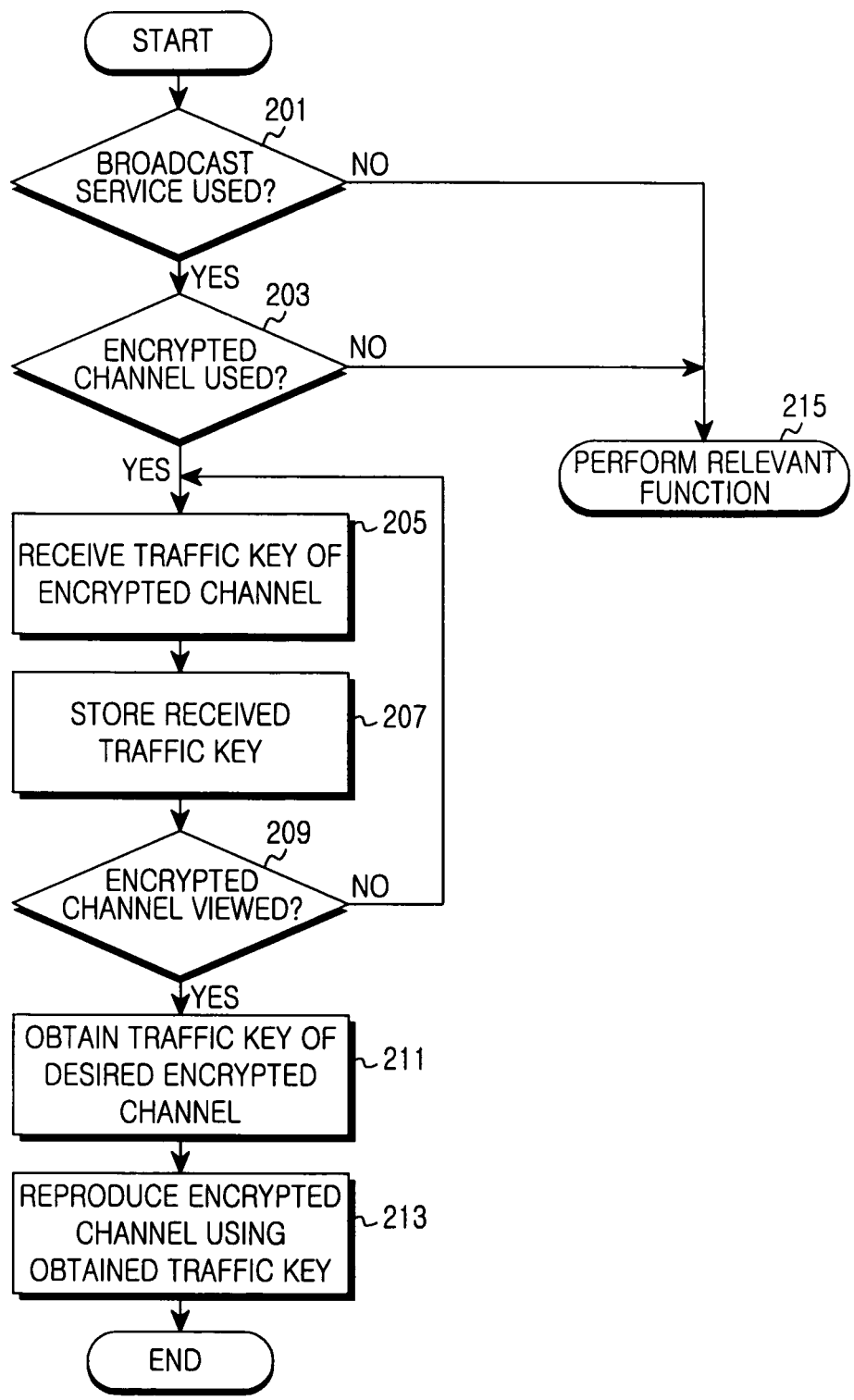
FIG. 2 illustrates a process for reproducing encrypted broadcasting in a mobile terminal according to an embodiment of the present invention.

FIG. 2 illustrates a process for reproducing encrypted broadcasting in a mobile terminal according to an embodiment of the present invention.

As shown in FIG. 2, the mobile terminal determines whether a user desires to use a broadcast service in block 201. When determining that the user does not desire to use the broadcast service in block 201, the mobile terminal performs a relevant function (e.g., a standby mode) in block 215.

In contrast, upon determining that the user desires to use the broadcast service in block 201, the mobile terminal receives a user-selected broadcast service (e.g., an unencrypted broadcast service). This is an operation of the conventional mobile terminal. A mobile terminal according to an embodiment of the present invention solves a delay problem occurring during reproduction of encrypted broadcasting by receiving and storing a traffic key for an encrypted broadcast service while receiving a broadcast service.

To solve the above problem, the mobile terminal, according to an embodiment of the present invention, performs a process for determining whether a user of the mobile terminal uses an encrypted channel. Here, the encrypted channel denotes a channel provided to a user by a broadcast service provider charging a separate fee for the channel. A viewer who has purchased a relevant channel can use a broadcast service of the relevant channel.

At this point, when a user of the mobile terminal subscribes to a subscription-based service in order to use an encrypted channel, the mobile terminal stores information of a broadcast service of the relevant channel in the service information storage. When the user uses the broadcast service, the mobile terminal determines the information stored in advance in the service information storage to determine whether the user uses (i.e. subscribes to) the encrypted channel.

When determining that the user of the mobile terminal does not use the encrypted channel in block 203, the mobile terminal performs a relevant function (e.g., provides unencrypted channel) in block 215.

Alternatively, when determining that the user of the mobile terminal uses the encrypted channel in block 203, the mobile terminal receives a traffic key corresponding to the encrypted channel in block 205. In block 207, the mobile terminal stores the received traffic key.

Here, the mobile terminal opens all traffic key stream channels of respective encrypted channels used by a user to monitor whether traffic key information is received. When the traffic key information is received, the mobile terminal extracts and stores a traffic key of a relevant channel using a service key.

In block 209, the mobile terminal determines whether a user desires to view an encrypted channel.

When determining that the user does not view the encrypted channel in block 209, the mobile terminal re-performs the process of block 205 to constantly receive a traffic key.

Alternatively, when determining that user desires to view the encrypted channel in block 209, the mobile terminal, in block 211, obtains a traffic key of the encrypted channel that the user desires to view from among the traffic keys that were stored in advance. In block 213, the mobile terminal reproduces the encrypted channel using the obtained traffic key.

The mobile terminal according to an embodiment of the present invention receives in advance a traffic key of an encrypted channel allowed to a user and stores the same before a user views the encrypted channel, such that a delay problem occurring when the conventional mobile terminal enters an encrypted channel and receives a traffic key after a predetermined time may be resolved.

After that, the mobile terminal ends the process.

Figure 3A:
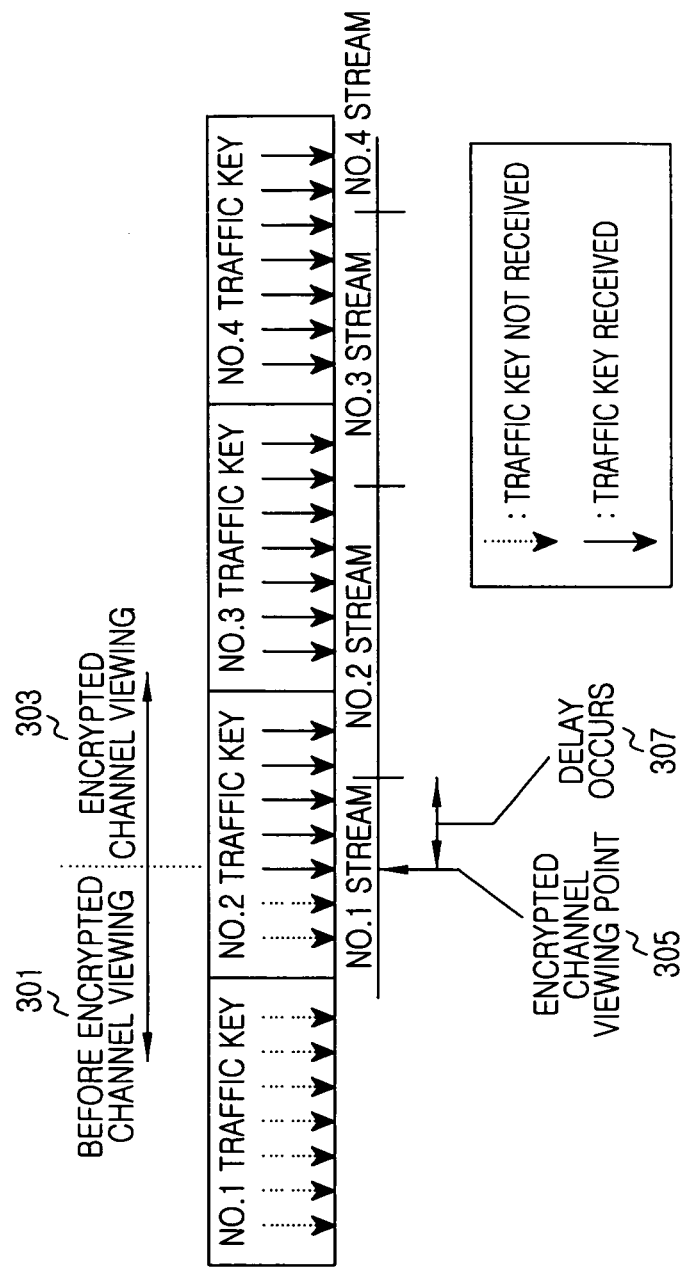
FIG. 3A illustrates a process for reproducing an encrypted channel in the conventional mobile terminal.
Figure 3B:
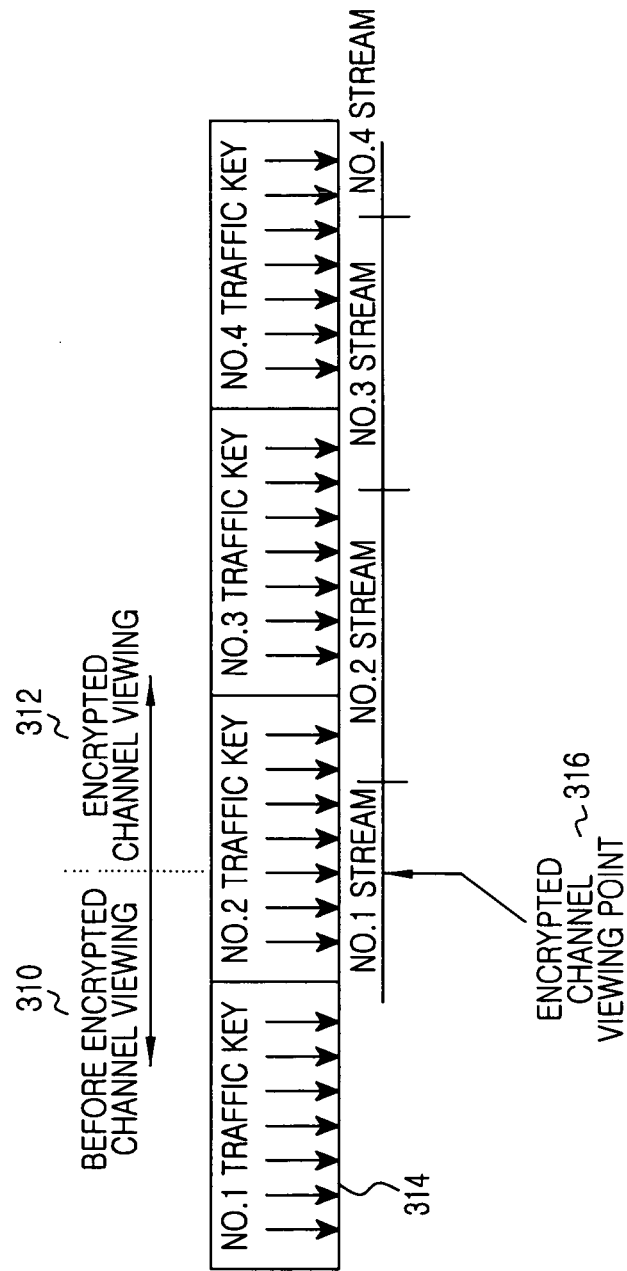
FIG. 3B illustrates a process for reproducing an encrypted channel in a mobile terminal according to an embodiment of the present invention.

FIGS. 3A and 3B illustrate the differences between encrypted channel reproduction of a mobile terminal according to an embodiment of the present invention and encrypted channel reproduction of a conventional mobile terminal.

FIG. 3A illustrates a process for reproducing an encrypted channel in the conventional mobile terminal.

As shown in FIG. 3A, a traffic key is received before a stream of relevant broadcasting is received. That is, as illustrated, the mobile terminal receives a 'No. 2' traffic key, which is a traffic key corresponding to a 'No. 2' stream while receiving a 'No. 1' stream before receiving the 'No. 2' stream.

Therefore, when the mobile terminal enters (305) an encrypted channel at a point of receiving a 'No. 1' stream and a 'No. 2' traffic key simultaneously, the mobile terminal may receive the 'No. 2' traffic key at the point of the entering. Accordingly, because the mobile terminal does not receive a 'No. 1' traffic key before the mobile terminal views (301) the encrypted channel, the mobile terminal cannot decipher the No. 1 stream using the 'No. 2' traffic key received at an encryption channel viewing point 303, and consequently cannot reproduce the relevant stream until receiving a 'No. 2' stream. Therefore, a delay occurs (307) until a point of receiving the 'No. 2' stream.

FIG. 3B illustrates a process for reproducing an encrypted channel in a mobile terminal according to an embodiment of the present invention.

As shown in FIG. 3B, and as described above, a traffic key is received before a stream of relevant broadcasting is received. That is, as illustrated, the mobile terminal receives a 'No. 2' traffic key, which is a traffic key corresponding to a 'No. 2' stream while receiving a 'No. 1' stream before receiving the 'No. 2' stream.

Alternatively, a mobile terminal according to an embodiment of the present invention receives and stores a traffic key corresponding to an encrypted channel if the encrypted channel allowed to a user exists even when receiving a general channel before (310) viewing the encrypted channel.

Therefore, when entering (316) the encrypted channel at a point of receiving the 'No. 1' stream and the 'No. 2' traffic key simultaneously, the mobile terminal may decipher and reproduce the 'No. 1' stream without a delay after (312) viewing the encrypted channel by receiving and storing a 'No. 1' traffic key and a 'No. 2' traffic key.

Figure 4:
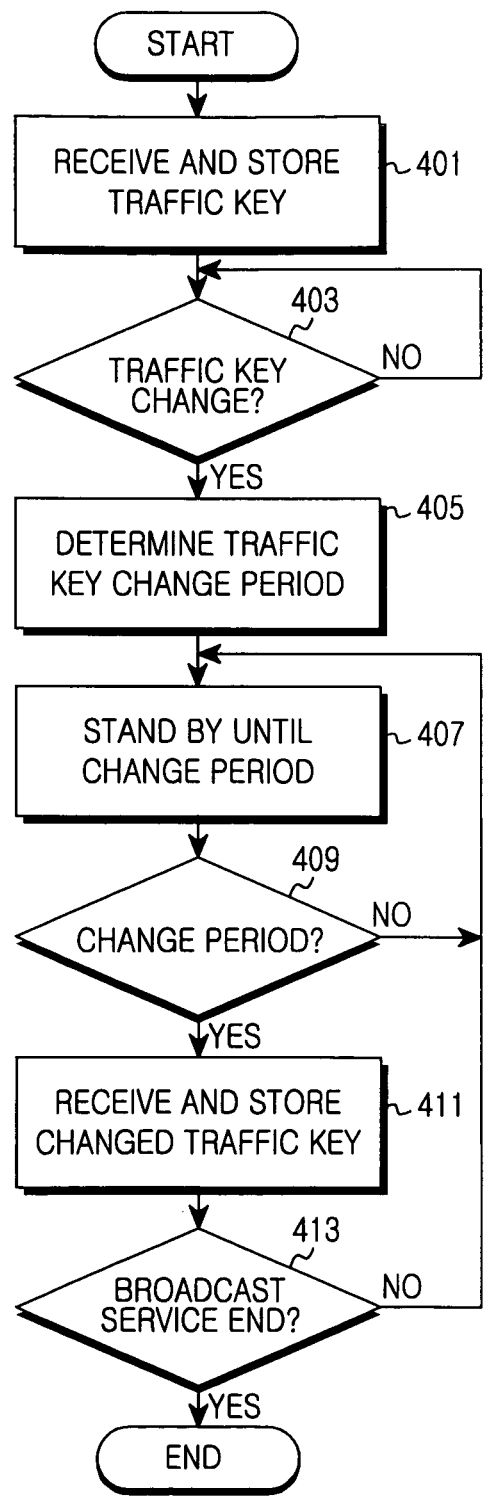
FIG. 4 illustrates a process for receiving a traffic key in a mobile terminal according to an embodiment of the present invention.

FIG. 4 illustrates a process for receiving a traffic key in a mobile terminal according to an embodiment of the present invention.

As shown in FIG. 4, and as described above, the mobile terminal may reduce a delay time in reproducing an encrypted channel by storing a traffic key prior to viewing the encrypted channel. As will be described further, the mobile terminal may also perform a process for monitoring the traffic key stream in order to solve a problem of having to receive a traffic key until a broadcast service ends.

That is, because monitoring a traffic key stream until broadcasting ends using a time-slice method for power efficiency in a broadcast system such as a Open Mobile Alliance (OMA) Mobile Broadcast Services Enabler Suite (BCAST) that uses a DVBH transmission system is unreasonable, a mobile terminal performs a monitoring process of the traffic key stream by waking up at a predetermined period, e.g. at a period when a traffic key changes, to receive and store a relevant traffic key.

To perform the monitoring process, the mobile terminal receives and stores a traffic key for a predetermined time in block 401, and determines whether the received traffic key changes in block 403.

When determining that the traffic key has not changed in block 403, the mobile terminal re-performs the process of block 403.

Alternatively, upon determining that the traffic key has changed in block 403, the mobile terminal determines a traffic key change period in block 405 and stands by without receiving the traffic key in block 407 until the change period determined arrives.

The mobile terminal determines whether it is a traffic key change period in block 409.

When determining that it is not the traffic key change period in block 409, the mobile terminal stands by without receiving the traffic key in block 407 until the traffic key change period arrives.

Alternatively, when determining that it is the traffic key change period in block 409, the mobile terminal receives and stores a traffic key in block 411. At this point, because the traffic key change period is a period at which the traffic key changes into a new traffic key, the mobile terminal receives and stores a changed traffic key.

In block 413, the mobile terminal determines whether a broadcast service end by the user is detected.

When the broadcast service end is not detected in block 413, the mobile terminal determines the change period and receives the traffic key again in block 411.

Alternatively, when the broadcast service end is detected in block 413, the mobile terminal ends the present algorithm.

Figure 5:
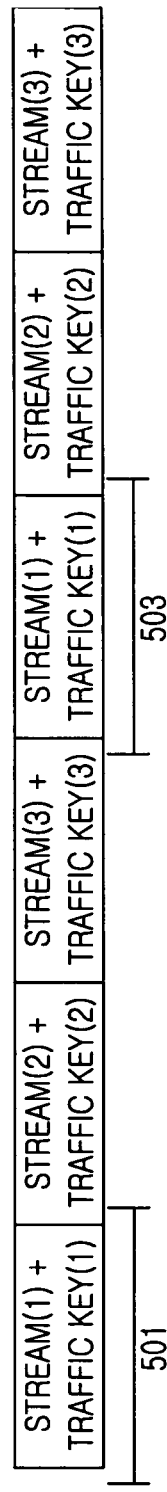
FIG. 5 illustrates a process for receiving a traffic key every traffic key change period in a mobile terminal according to an embodiment of the present invention.

FIG. 5 illustrates a process for receiving a traffic key every traffic key change period in a mobile terminal according to an embodiment of the present invention.

As shown in FIG. 5, when three encrypted channels transmit DVBH signals using a time slice method, three DVBH transmission channels are not transmitted/received continuously in parallel, but transmitted in three burst types non-continuously. When transmitting signals in this manner, the mobile terminal operates a receiver only when receiving contents of a channel that the mobile terminal desires to reproduce and stands by without operating the receiver when not receiving contents, thereby reducing power consumption.

According to an embodiment of the present invention, a mobile terminal that receives a traffic key using a traffic key monitoring method may encounter the problem of having to operate a receiver even when a broadcast service is not actually viewed. Therefore, to solve the above problem, the mobile terminal measures a traffic key reception period initially, estimates a period at which traffic actually changes, and operates (501, 503) the receiver at a predetermined point before and after the estimated period, thereby reducing power consumption.

That is, the mobile terminal operates the receiver at a point (predetermined point before) of receiving a traffic key, and ends the operation of the receiver at a point (predetermined point after) at which the traffic key reception ends to receive the changed traffic key during the relevant section.

As described above, according to an embodiment of the present invention, a mobile terminal stores a traffic key in advance before reproducing encrypted broadcasting to reduce a reproduction delay. Because the traffic key is transmitted in advance prior to the encrypted stream, a channel reproduction delay problem may be solved. In addition, the mobile terminal receives a traffic key only at a period in which the traffic key changes to reduce power consumption of the mobile terminal.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. An apparatus for reducing a channel reproduction delay in a mobile terminal, the apparatus comprising:
   a controller configured to:
   receive and control a storage device to store a traffic key corresponding to an encrypted channel before receiving a request to view the encrypted channel;
   receive an encrypted broadcast data corresponding to the encrypted channel and decipher the encrypted broadcast data using the stored traffic key in response to the request to view the encrypted channel;
   estimate a period of time when the traffic key changes;
   when the mobile terminal is not receiving the encrypted channel, control a receiver of the mobile terminal to operate during a predetermined period of time before and after the estimated period of time to receive the changed traffic key; and
   when the mobile terminal is not receiving the encrypted channel, end operation of the receiver in response to receiving the traffic key to reduce power consumption of the mobile terminal.

2. The apparatus of claim 1, wherein the controller is configured to receive and control the storage device to store the traffic key transmitted prior to a corresponding stream of the encrypted channel to reduce a reproduction delay that occurs when receiving the corresponding stream of the encrypted channel that matches with the traffic key.

3. The apparatus of claim 1, wherein the controller is configured to determine whether the encrypted channel is allowed in response to a request to use a broadcast service, and determine information regarding the allowed encrypted channel prior to receiving and storing the traffic key corresponding to the encrypted channel.

4. The apparatus of claim 1, wherein the controller is configured to set an identifier corresponding to an encrypted broadcasting to store a traffic key for each encrypted broadcast in the allowed encrypted channel.

5. The apparatus of claim 4, wherein the identifier comprises at least one of Internet Protocol (IP) information and a Program Identifier (HD) of a relevant channel.

6. A method for reducing a channel reproduction delay in a mobile terminal, the method comprising:
receiving a traffic key corresponding to an encrypted channel before receiving a request to view the encrypted channel;
storing the received traffic key;
in response to the request to view the encrypted channel, receiving an encrypted broadcast data corresponding to the encrypted channel and deciphering the encrypted broadcast data using the stored traffic key;
estimating a period of time when the traffic key changes;
when the mobile terminal is not receiving the encrypted channel, controlling a receiver of the mobile terminal to operate during a predetermined period of time before and after the estimated period of time to receive the changed traffic key; and
when the mobile terminal is not receiving the encrypted channel, ending operation of the receiver in response to receiving the traffic key to reduce power consumption of the mobile terminal.

7. The method of claim 6, wherein the traffic key is received and stored prior to a corresponding stream of the encrypted channel to reduce a reproduction delay that occurs when receiving the corresponding stream of the encrypted channel that matches with the traffic key.

8. The method of claim 6, wherein storing the received traffic key corresponding to the encrypted channel comprises:
determining whether the encrypted channel is allowed in response to a request to use a broadcast service to determine information regarding the allowed encrypted channel prior to receiving the traffic key of the determined encrypted channel.

9. The method of claim 6, wherein storing the received traffic key corresponding to the encrypted channel comprises setting an identifier corresponding to an encrypted broadcasting to store a traffic key for each encrypted broadcast in the allowed channel.

10. The method of claim 9, wherein the identifier comprises at least one of Internet Protocol (IP) information and a Program Identifier (PID) of a relevant channel.

11. A mobile device comprising:
a communication unit configured to receive radio frequency (RF) signals and recover data from the received RF signals;
a broadcast information storage configured to store a plurality of traffic keys; and
a controller configured to:
receive a traffic key corresponding to an encrypted channel before receiving a request to view the encrypted channel;
control the broadcast information storage to store the traffic key corresponding to the encrypted channel in the broadcast information storage;
decipher the encrypted broadcast data using the stored traffic key in response to the request to view the encrypted channel;
estimate a period of time when the traffic key changes;
when the mobile device is not receiving the encrypted channel, control a receiver of the communication unit to operate during a predetermined period of time before and after the estimated period of time to receive the changed traffic key; and
when the mobile device is not receiving the encrypted channel, end operation of the receiver in response to receiving the traffic key to reduce power consumption of the mobile terminal.

12. The mobile device of claim 11, wherein the controller is configured to receive and control to store the traffic key transmitted prior to a corresponding stream of the encrypted channel to reduce a reproduction delay that occurs when receiving the corresponding stream of the encrypted channel that matches with the traffic key.

13. The mobile device of claim 11, wherein the broadcast information storage is configured to store information of a broadcast service for each encrypted channel that the mobile device is allowed to reproduce.

14. The mobile device of claim 13, wherein the controller is configured to determine whether the encrypted channel is allowed by determining whether the information of the broadcast service for the encrypted channel is stored in the broadcast information storage prior to receiving and storing the traffic key corresponding to the encrypted channel.

15. The mobile device of claim 11, wherein the controller is configured to receive the traffic key for a predetermined time to estimate the period of time at which the traffic key changes, and control the communication unit to receive and the storage device to store a new traffic key corresponding to the encrypted channel at a point at which the traffic key changes.

16. The mobile device of claim 11, wherein the controller is configured to set an identifier corresponding to an encrypted broadcasting to store a traffic key for each encrypted broadcast in the allowed encrypted channel.

17. The mobile device of claim 16, wherein the identifier comprises at least one of Internet Protocol (IP) information and a Program Identifier (PID) of a relevant channel.

* * * * *